United States Patent [19]

Lerot et al.

[11] Patent Number: 5,180,693

[45] Date of Patent: Jan. 19, 1993

[54] PROCESS FOR THE PRODUCTION OF A COMPOSITE OF METAL OXIDES, COMPOSITE POWDERS OF METAL OXIDES AND CERAMIC MATERIALS

[75] Inventors: Luc Lerot, Brussels; Franz Legrand, Quaregnon; Joël Bourjot, Brussels, all of Belgium

[73] Assignee: Solvay S.A., Brussels, Belgium

[21] Appl. No.: 556,078

[22] Filed: Jul. 20, 1990

[30] Foreign Application Priority Data

Jul. 20, 1989 [BE] Belgium .............................. 8900797

[51] Int. Cl.$^5$ ................................................ C03C 3/00
[52] U.S. Cl. ........................................ 501/12; 501/127
[58] Field of Search ............... 501/12, 9, 127, 153; 65/17

[56] References Cited

U.S. PATENT DOCUMENTS

| | | | |
|---|---|---|---|
| 3,634,113 | 1/1972 | Fehrenbacher | 106/55 |
| 3,860,529 | 1/1975 | Hamling | 252/301.1 R |
| 4,419,311 | 12/1983 | Claussen et al. | 264/60 |
| 4,680,045 | 7/1987 | Osafune et al. | 65/17 |
| 4,680,046 | 7/1987 | Matsuo et al. | 65/17 |
| 4,680,048 | 7/1987 | Motoki et al. | 65/17 |
| 4,714,567 | 12/1987 | Roha | 252/315.2 |
| 4,786,618 | 11/1988 | Shoop | 501/12 |
| 4,798,710 | 1/1989 | Legrand et al. | 423/69 |
| 4,801,318 | 1/1989 | Toki et al. | 65/18.1 |
| 4,801,399 | 1/1989 | Clark et al. | 252/315.01 |
| 4,816,072 | 3/1989 | Harley et al. | 501/12 |
| 4,830,993 | 5/1989 | Legrand et al. | 501/103 |
| 4,835,298 | 5/1989 | Terbot et al. | 556/173 |
| 4,849,378 | 7/1989 | Hench et al. | 501/12 |
| 4,888,314 | 12/1989 | Bernier et al. | 501/119 |
| 4,898,842 | 2/1990 | David | 501/9 |
| 4,929,436 | 5/1990 | Legrand et al. | 423/593 |
| 4,952,536 | 8/1990 | Block | 501/127 |
| 4,981,819 | 1/1991 | Rinn | 501/12 |
| 5,009,688 | 4/1991 | Nakanishi | 65/18.3 |
| 5,019,293 | 5/1991 | Burutch | 252/313.1 |
| 5,047,174 | 9/1991 | Sherif | 252/309 |
| 5,049,528 | 9/1991 | Moffatt | 501/94 |
| 5,064,783 | 11/1991 | Lockevich | 501/12 |

FOREIGN PATENT DOCUMENTS

| | | |
|---|---|---|
| 0234816 | 9/1987 | European Pat. Off. . |
| 3216651 | 11/1983 | Fed. Rep. of Germany . |
| 2168334 | 6/1986 | United Kingdom . |
| 2204030 | 11/1988 | United Kingdom . |

OTHER PUBLICATIONS

P. William Lee, "Ceramics", Reinhold Publishing Corporation, p. 1 (1961).
Kirk-Othmer Encyclopedia of Chemical Technology, Third Edition, vol. 5, pp. 234–236 (1979).
W. C. Moffatt et al., Materials Science Monographs—High Tech Ceramics, vol. 38, pp. 1345–1356 (1987).
S. R. Gurkovich, "Crystallization of Amorphous Lead-Titanate Prepared by a Sole-Gel Process", Ferroelectrics, vol. 62, pp. 189–190 (1985).
"Journal of the American Ceramic Society" vol. 68, No. 2, pp. C-60-C-62, Feb. 1985.
"Materials Research Society Symposia Proceedings" vol. 32; Brinkes et al. "Better Ceramics . . ." pp. 184–196.
"Journal of the American Ceramic Society" vol. 69, No. 3, pp. 268–269, 1986.
"Patent Abstracts of Japan", vol. 12, No. 56, (C–477) [2903], Feb. 29, 1988.

Primary Examiner—William R. Dixon, Jr.
Assistant Examiner—Alan Wright
Attorney, Agent, or Firm—Spencer, Frank & Schneider

[57] ABSTRACT

Process for the production of a composite of metal oxides, according to which a metal alcoholate is hydrolysed in the presence of metal (hydr)oxide particles in order to convert the metal alcoholate into a metal (hydr)oxide gel enveloping the metal (hydr)oxide particles. Powders of a composite of metal oxides obtained by this process and ceramic materials obtained by sintering a powder of this type.

12 Claims, 1 Drawing Sheet

PROCESS FOR THE PRODUCTION OF A COMPOSITE OF METAL OXIDES, COMPOSITE POWDERS OF METAL OXIDES AND CERAMIC MATERIALS

The invention relates to a process enabling the production of composites of metal oxides as well as powders of metal oxides obtained by this process and ceramic materials produced by sintering such powders.

The ceramic materials are non-metallic inorganic materials, the use of which requires treatments at elevated temperature, such as fusion or sintering treatments (P. William Lee—"Ceramics"—1961—Reinhold Publishing Corp.—p. 1; Kirk-Othmer—Encyclopedia of Chemical Technology—Third edition—vol. 5—19-79—John Wiley & Sons—USA—p. 236).

The ceramic materials generally have a poor capacity to resist significant variations in temperature, in particular thermal shocks, without undergoing progressive degradation of their mechanical properties.

In order to improve the mechanical properties of the ceramic materials obtained by sintering, in particular their resistance to thermal shocks, it has been contemplated to include therein a disperse phase of a compound having different stable allotropic varieties depending on whether it is at ambient temperature or at the sintering temperature. Zirconium oxide and hafnium oxide are recommended for the disperse phase, the dispersing phase being able to be, for example, aluminium oxide (FR-A-2,330,660). These ceramic materials are produced by sintering composite powders comprising at least two different metal oxides which are intended to, form, respectively, the dispersing phase and the disperse phase of the ceramic material.

Various processes have been proposed for the production of composite powders of this type.

A first known process consists in mechanically mixing a powder of the material of the dispersing phase with a powder of the compound of the disperse phase (FR-A-2,330,660). This known process involves an intensive and lengthy mixing and it does not lend itself well to obtaining composite powders of homogeneous composition.

According to another known process, a bath is prepared by melting the material of the dispersing phase and the compound of the disperse phase and the bath is subjected to chilling by spraying it in fine droplets to form a powder (DE-A-3,216,651). This process is difficult to implement; it involves very high temperatures and it lends itself only with difficulty to the production of highly refractory ceramic materials.

A process is also known according to which a zirconium alcoholate is hydrolysed in the presence of an alumina powder under controlled conditions to precipitate a zirconium oxide powder on the alumina powder. In this known process the alumina powder is dispersed in a liquid organic medium containing the dissolved zirconium alcoholate and the resulting organic suspension is mixed with water under controlled conditions to hydrolyse the zirconium alcoholate and precipitate the zirconium oxide powder (Materials Science Monographs—High Tech Ceramics, Vol. 38, parts A—C, 1987, Elsevier Science Publishers B.V., Amsterdam : part B, pages 1345 to 1356). In this known process it is difficult to prevent a parasitic seeding of zirconium oxide in the reaction mixture, outside of the grains forming the alumina powder, which adversely affects the homogeneity of the composite alumina and zirconium oxide powder.

The aim of the invention is to overcome the disadvantages of the known processes described above by providing a new process which makes it possible to produce more easily composites of metal oxides, in particular composite powders, the chemical homogeneity of which is improved relative to that generally obtained with the known processes.

Consequently, the invention relates to a process for the production of a composite of metal oxides, according to which a metal alcoholate is hydrolysed in the presence of metal (hydr)oxide particles, controlling the hydrolysis in order to convert the metal alcoholate into a metal (hydr)oxide gel enveloping the metal (hydr)oxide particles.

In the process according to the invention, the composite of metal oxides is a solid material formed from a mixture of oxides of at least two different metals, it being possible, for example, for the material to be in the form of a solid block or of a powder of fine, approximately spherical, acicular or tabular (or flat) particles.

The term metal (hydr)oxide is intended to denote a metal oxide, a metal hydroxide or a mixture of a metal oxide and metal hydroxide. The metal (hydr)oxide may be anhydrous or hydrated and in the amorphous or crystalline state.

The metal (hydr)oxide particles generally have a diameter which does not exceed a few microns, generally less than 10 microns. Recommended diameters are those which do not exceed 5 microns, for example between 0.05 and 2 microns; diameters smaller than 1 micron are preferred.

The metal alcoholate is a compound in which a metal is bonded via an oxygen atom to a hydrocarbon group such as an aromatic group or a straight-chain or cyclic, saturated or unsaturated, unsubstituted or partially or completely substituted aliphatic group. The metal alcoholates containing aliphatic groups are particularly recommended; those containing unsubstituted saturated aliphatic groups are preferred, such as, for example, the methyl, ethyl, n-propyl, isopropyl, n-butyl and isobutyl groups.

The purpose of the hydrolysis is to convert the metal alcoholate to the metal oxide or hydroxide. According to the invention it is carried out under the known conditions of the "sol-gel" technique, in order to cause gelling of the reaction mixture and prevent precipitation (Ferroelectrics, 1985, Vol. 62, pages 189 and 190).

The hydrolysis can be carried out in ambient air. However, in order to prevent an uncontrolled decomposition of the metal alcoholate it is desirable that the hydrolysis is carried out under a moisture-free gaseous atmosphere. Anhydrous air, nitrogen and argon are examples of atmospheres which can be used in the process according to the invention.

In principle, the temperature and the pressure are not critical. In general, in the majority of cases, it is possible to operate at ambient temperature and normal atmospheric pressure.

Particular features and further details relating to the hydrolysis are explained in the document EP-A-0,234,647 or U.S. Pat. No. 4,853,207 (SOLVAY & Cie).

The product collected at the end of the hydrolysis is a gelled mass of, generally hydrated, metal oxide or hydroxide enveloping the metal (hydr)oxide particles in the same way as a gangue. It can be used as such; it is preferred to subject it to drying beforehand.

In a preferred embodiment of the process according to the invention, in order to hydrolyse the metal alcoholate in the presence of metal (hydr)oxide particles, the latter are dispersed in an organic solution of the metal alcoholate and the resulting organic suspension is treated with water. The water is preferably used in the dissolved state in an organic liquid, generally an alcohol.

In this embodiment of the process according to the invention the optimum degrees of dilution of the alcoholate and of the water in their respective solvents depend on diverse factors, in particular the metal involved in the composition of the metal alcoholate, the alcoholate selected, the solvents used and the operating temperature; they must be determined in each particular case by a routine laboratory operation. Particular features and further details relating to this method of carrying out the hydrolysis are explained in the document EP-A-0,234,647 (SOLVAY & Cie).

In another particularly advantageous embodiment of the process according to the invention, the metal (hydr)oxide particles used are obtained by subjecting a metal alcoholate to a hydrolysis under controlled conditions in order to precipitate the particles without the reaction mixture resulting from the hydrolysis gelling to a mass. Particular features and further details relating to this method of carrying out the hydrolysis are explained in the documents EP-A-0,238,103, EP-A-0,263,544 and EP-A-0,286,155 (SOLVAY & Cie). This embodiment of the process according to the invention has the advantage of providing a composite in which the metal (hydr)oxide particles are of homogeneous shape (which is approximately spherical) and dimensions.

In another particularly advantageous embodiment of the process according to the invention the gelled mass collected at the end of the hydrolysis is subjected to a fragmentation, for example in a friction grinder, in order to convert it to a powder. In a variant of this embodiment, the powder collected at the end of the fragmentation is subjected to heating under controlled conditions in order to crystallize the metal oxides. In this embodiment of the process according to the invention and the variant for carrying it out, the fragmentation is preferably controlled so that the grains of the powder produced have an average diameter larger than the diameter of the metal (hydr)oxide particles, the average diameter being defined by the relationship $$d = \frac{\Sigma n_i d_i}{\Sigma n_i}$$

where $n_i$ denotes the frequency (number or mass) of the grains of diameter $d_i$.

In general, the fragmentation is controlled so that the average diameter of the grains of the powder is between 0.1 and 10 microns, for example, less than 5 microns; the average diameters less than 2 microns are preferred.

The embodiment which has just been described and the variant for carrying it out are particularly recommended for the production of ceramic materials by sintering powders of metal oxides.

Consequently, the invention also relates to composite powders of metal oxides obtained by means of the process according to the invention and to ceramic materials obtained by sintering such powders. The invention relates particularly to composite powders of at least two different metal oxides, one of which exists in two different allotropic varieties and has a natural allotropic conversion temperature located between the sintering temperature of the powder and ambient temperature. The invention relates in particular to powders comprising crystals of non-stabilized zirconium oxide and crystals of aluminium oxide and/or silicon oxide (for example mullite, cordierite or sialon crystals), as well as ceramic materials obtained by sintering such powders. In these composite powders and these ceramic materials according to the invention, the crystals of non-stabilized zirconium oxide are crystals capable of undergoing allotropic conversions. In fact, zirconium oxide in the pure state has the characteristic of existing in three different allotropic forms depending on the temperature, that is to say:

the monoclinic form up to about 1100° C.,
the tetragonal or quadratic form between 1100° and 2200° C., and
the cubic form above 2200° C.

The allotropic conversions of zirconium oxide are accompanied by significant changes in volume and it is known that the tetragonal form or the cubic form can be stabilized at low temperature by incorporating in its crystalline lattice oxides of other suitably chosen metals, in particular oxides of rare earth metals or mischmetal oxide (U.S. Pat. No. 3,634,113; U.S. Pat. No. 3,860,529).

Within the framework of the invention, the term "non-stabilized zirconium oxide" denotes zirconium oxide in the crystalline state, the cubic or tetragonal form of which has not been stabilized at low temperature in the manner explained above, or has been only partially stabilized.

Examples of composite powders according to the invention contain between 5 and 50% by volume of zirconium (hydr)oxide, preferably between 10 and 25%.

The composites according to the invention are formed from a dispersing phase of metal oxide containing a disperse phase of metal (hydr)oxide particles. The invention allows a precise control of the composition by weight of these composites to be obtained. It has the additional advantage of providing composites in which the size of the dispersed particles of metal (hydr)oxide can be controlled with great precision, said particles being dispersed in a homogeneous manner in the composite.

The following example serves to illustrate the invention, with reference to the appended plate which is a photographic reproduction of a composite according to the invention with a magnification of 20,000×.

The example relates to the preparation of a precursor composite material of a mixture of mullite and zirconium oxide, according to the invention, with reference to the single figure of the appended plate, which is a photographic reproduction of this precursor composite material.

100 ml of a 0.2 molar solution of zirconium n-butoxide in ethanol and 1.5 ml of oleic acid were introduced into a reaction chamber kept under an atmosphere of anhydrous nitrogen at a temperature of 25° C. After homogenizing the mixture, the latter was subjected to vigourous stirring and 100 ml of a 1.25 molar solution of water in ethanol was added thereto in a single amount and the reaction mixture was then subjected to ripening for 2 hours. To this end the procedure was as explained in the documents EP-A-0,238,103, EP-A-0,286,155 and GB-A-2,168,334. At the end of ripening, the reaction mixture was subjected to centrifuging and a powder was collected which was washed with anhydrous alcohol and then dried by means of a stream of anhydrous air at ambient temperature. The powder proved to consist of substantially spherical particles having an average diameter of 0.24 micron, formed from a complex mixture of amorphous hydrated zirconium oxide and hydroxide and organic residues.

The zirconium (hydr)oxide particles were redispersed in ethanol and, after homogenizing, the resulting suspension was introduced into a chamber kept under an atmosphere of anhydrous nitrogen at a temperature of 25° C. 75 ml of a solution of aluminium butoxide, tetraethyl orthosilicate and water in 2-methoxy-1-ethanol (concentrations equivalent to 1 mol of aluminium, 0.33 mol of silicon and 1.5 mol of water per 1 l of solution) had previously been introduced into the chamber. The suspension of zirconium (hydr)oxide particles was introduced into the chamber in an amount corresponding to 0.3 mol of zirconium per mol of aluminium. After homogenization of the mixture, 35 ml of a solution of water in 2-methoxy-1-ethanol (40% by volume) was added thereto. The reaction mixture was allowed to solidify by forming a gel, which took about 45 minutes. The gel was collected and dried in a stream of dry air at 120° C., which caused its fragmentation. The gel was then ground and then subjected to drying in air at 500° C. for four hours.

The figure shows the gel before drying at 500° C.

We claim:

1. A process for the production of a pre-ceramic mixture of different metal oxides comprising:
   a) dispersing particles of a first metal oxide in a solution of an alcoholate of a second metal in an organic solvent selected from alcohol and alcohol derivatives to provide an organic suspension of said first metal oxide particles;
   b) reacting said organic suspension with water to hydrolyse said alcoholate of a second metal; and
   c) controlling said hydrolysis to convert said alcoholate of a second metal into a gel of a second metal oxide enveloping said particles of a first metal oxide, drying said gel of a second metal oxide enveloping said particles of a first metal oxide, fragmenting said dried gel of a second metal oxide enveloping said particles of a first metal oxide to convert it to a powder, and heating said powder under controlled conditions to crystallize said metal oxides.

2. A process for the production of a pre-ceramic mixture of different metal hydroxides comprising:
   a) dispersing particles of a first metal hydroxide in an organic solution of an alcoholate of a second metal to provide an organic suspension;
   b) reacting said organic suspension with water to hydrolyse said alcoholate of a second metal; and
   c) controlling said hydrolysis to convert said alcoholate of a second metal into a gel of a second metal hydroxide enveloping said particles of a first metal hydroxide.

3. The process according to claim 1, wherein said pre-ceramic mixture further comprises metal hydroxide particles.

4. The process according to claim 2, further comprising drying said gel of a second metal hydroxide enveloping said particles of a first metal hydroxide, fragmenting said dried gel of second metal hydroxide enveloping said particles of a first metal hydroxide to convert it to a powder, and heating said powder under controlled conditions to crystallize said metal hydroxides.

5. The process according to claim 2, wherein said metal hydroxide particles have a diameter of between 0.05 and 2 microns.

6. The process according to claim 2, wherein said particles are zirconium hydroxide and said alcoholate is selected from the group consisting of aluminium alcoholate and silicon alcoholate.

7. A process for the production of a pre-ceramic mixture of metal oxides comprising:
   a) dispersing particles of a first metal oxide in a solution of an alcoholate of a second metal in an organic solvent selected from alcohol and alcohol derivatives to provide an organic suspension of said first metal oxide particles;
   b) reacting said organic suspension with water to hydrolyse said alcoholate of a second metal and form an oxide of said second metal enveloping said particles of a first metal oxide; and
   c) controlling said hydrolysis to precipitate said particles of a first metal oxide without said oxide of a second metal forming a gel.

8. A process for the production of a pre-ceramic mixture of different metal hydroxides comprising:
   a) dispersing particles of a first metal hydroxide in a solution of an alcoholate of a second metal in an organic solvent selected from alcohol and alcohol derivatives to provide an organic suspension of said first metal oxide particles;
   b) reacting said organic suspension with water to hydrolyse said alcoholate of a second metal and form a hydroxide of said second metal enveloping said particles of a first metal hydroxide; and
   c) controlling said hydrolysis to precipitate said particles of a first metal hydroxide without said hydroxide of a second metal forming a gel.

9. The process set forth in claim 1, wherein said organic solvent is selected from the group consisting of methanol, ethanol, n-propanol, isopropanol, n-butanol, isobutanol, and alkoxy derivatives thereof.

10. The process set forth in claim 1, wherein said water reacted with said organic suspension to hydrolyze said second metal alcoholate is water contained in an organic solvent selected from alcohols and alcohol derivatives.

11. The process according to claim 1, wherein said metal oxide particles have a diameter of between 0.05 and 2 microns.

12. The process according to claim 11, wherein said particles are zirconium oxide and said alcoholate is selected from the group consisting of aluminium alcoholate and silicon alcoholate.

* * * * *